US010929924B2

(12) United States Patent
Koltnow et al.

(10) Patent No.: US 10,929,924 B2
(45) Date of Patent: *Feb. 23, 2021

(54) MOBILE NUMBER CREDIT PRESCREEN

(71) Applicant: Comenity LLC, Columbus, OH (US)

(72) Inventors: Adam Koltnow, Worthington, OH (US); James Walz, Blacklick, OH (US)

(73) Assignee: Comenity LLC, Columbus, OH (US)

( * ) Notice: Subject to any disclaimer, the term of this patent is extended or adjusted under 35 U.S.C. 154(b) by 549 days.

This patent is subject to a terminal disclaimer.

(21) Appl. No.: 15/051,526

(22) Filed: Feb. 23, 2016

(65) Prior Publication Data
US 2017/0061532 A1 Mar. 2, 2017

Related U.S. Application Data

(60) Provisional application No. 62/209,806, filed on Aug. 25, 2015.

(51) Int. Cl.
G06Q 40/00 (2012.01)
G06Q 40/02 (2012.01)
H04W 4/14 (2009.01)

(52) U.S. Cl.
CPC ............ G06Q 40/025 (2013.01); H04W 4/14 (2013.01)

(58) Field of Classification Search
CPC .. G06Q 40/025; G06Q 20/383; G06Q 50/265; G06Q 99/00; G06Q 20/24; G06Q 40/00
USPC .......................................................... 705/38
See application file for complete search history.

(56) References Cited

U.S. PATENT DOCUMENTS

| 5,239,462 A | 8/1993 | Jones et al. |
| 6,144,848 A | 11/2000 | Walsh et al. |
| 7,546,266 B2 | 6/2009 | Beirne et al. |
| 7,797,231 B1 | 9/2010 | Loeb et al. |
| 8,010,446 B2 | 8/2011 | Talbert et al. |
| 8,112,349 B2 | 2/2012 | Beirne et al. |
| 8,412,593 B1 | 4/2013 | Song et al. |
| 8,738,024 B1 | 5/2014 | Kerr et al. |
| 9,639,597 B2 | 5/2017 | Eigner et al. |
| 9,741,045 B1 | 8/2017 | Henderson et al. |

(Continued)

FOREIGN PATENT DOCUMENTS

WO 2015026863 A1 2/2015

OTHER PUBLICATIONS

Martin, "In-Pocket, Phone Beaconing: Tapping into the Store Shopper", http://www.mediapost.com/publications/article/241674/in-pocket-phone-beaconing-tapping-into-the-store.html, Jan. 14, 2015, 1-3.

Primary Examiner — Ojo O Oyebisi

(57) ABSTRACT

A method for mobile number credit prescreen is disclosed. The method obtains a phone number associated with a customer's mobile device. The phone number is utilized to access a mobile carrier service and obtain identifying information about the customer. A credit reporting agency is accessed and the identifying information about the customer is used to perform a credit prescreen. In addition, when the customer passes the credit prescreen, the identifying information about the customer and a result of the credit prescreen are used to pre-fill a credit application form. The pre-filled credit application form in conjunction with a pre-approved credit offer is then provided to the customer.

15 Claims, 3 Drawing Sheets

(56) References Cited

U.S. PATENT DOCUMENTS

| | | |
|---|---|---|
| 10,169,775 B2 | 1/2019 | Koltnow et al. |
| 2005/0125390 A1 | 6/2005 | Hurst-Hiller et al. |
| 2006/0068898 A1 | 3/2006 | Maya |
| 2006/0149630 A1 | 7/2006 | Elliott et al. |
| 2006/0181411 A1 | 8/2006 | Fast et al. |
| 2008/0306749 A1 | 12/2008 | Fredlund et al. |
| 2009/0099914 A1 | 4/2009 | Lang et al. |
| 2012/0029996 A1 | 2/2012 | Lang et al. |
| 2013/0132360 A1 | 5/2013 | Kuznetsov et al. |
| 2014/0058870 A1 | 2/2014 | Zhao |
| 2014/0070001 A1 | 3/2014 | Sanchez et al. |
| 2014/0172477 A1 | 6/2014 | Goulart et al. |
| 2014/0172687 A1* | 6/2014 | Chirehdast ............. G06Q 40/00 705/38 |
| 2014/0365334 A1 | 12/2014 | Hurewitz |
| 2015/0170194 A1 | 6/2015 | Stibel et al. |
| 2015/0227631 A1 | 8/2015 | Legrand et al. |
| 2015/0262248 A1 | 9/2015 | Chaouki et al. |
| 2016/0012375 A1 | 1/2016 | Hanson et al. |
| 2016/0078358 A1 | 3/2016 | Baveja et al. |
| 2017/0039588 A1 | 2/2017 | Koltnow et al. |
| 2017/0039616 A1 | 2/2017 | Korra et al. |
| 2018/0053252 A1 | 2/2018 | Koltnow et al. |
| 2019/0087848 A1 | 3/2019 | Koltnow et al. |

\* cited by examiner

MOBILE NUMBER CREDIT PRESCREEN

CROSS-REFERENCE TO RELATED APPLICATIONS (PROVISIONAL)

This application claims priority to and benefit of U.S. Provisional Patent Application No. 62/209,806 filed on Aug. 25, 2015, entitled "MOBILE NUMBER CREDIT PRE-SCREEN" by Adam Koltnow et al., and assigned to the assignee of the present application, the disclosure of which is hereby incorporated herein by reference in its entirety.

BACKGROUND

Company specific, brand specific or even card network or bank specific credit cards provide significant value to both consumer and provider. By issuing a brand specific credit card, the provider is able to provide a consumer with an increase in spending power, tailored rewards and/or offers, loyalty discounts, and the like while maintaining consumer brand loyalty. Similarly, the consumer receives the perks from the increased spending power, reward offers, loyalty discounts and the like. Additionally, the more convenient the service, the more likely the consumer will provide company specific recommendations via word of mouth, social networks, internet rating sites, and the like.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DESCRIPTION OF EMBODIMENTS

Figure 1:
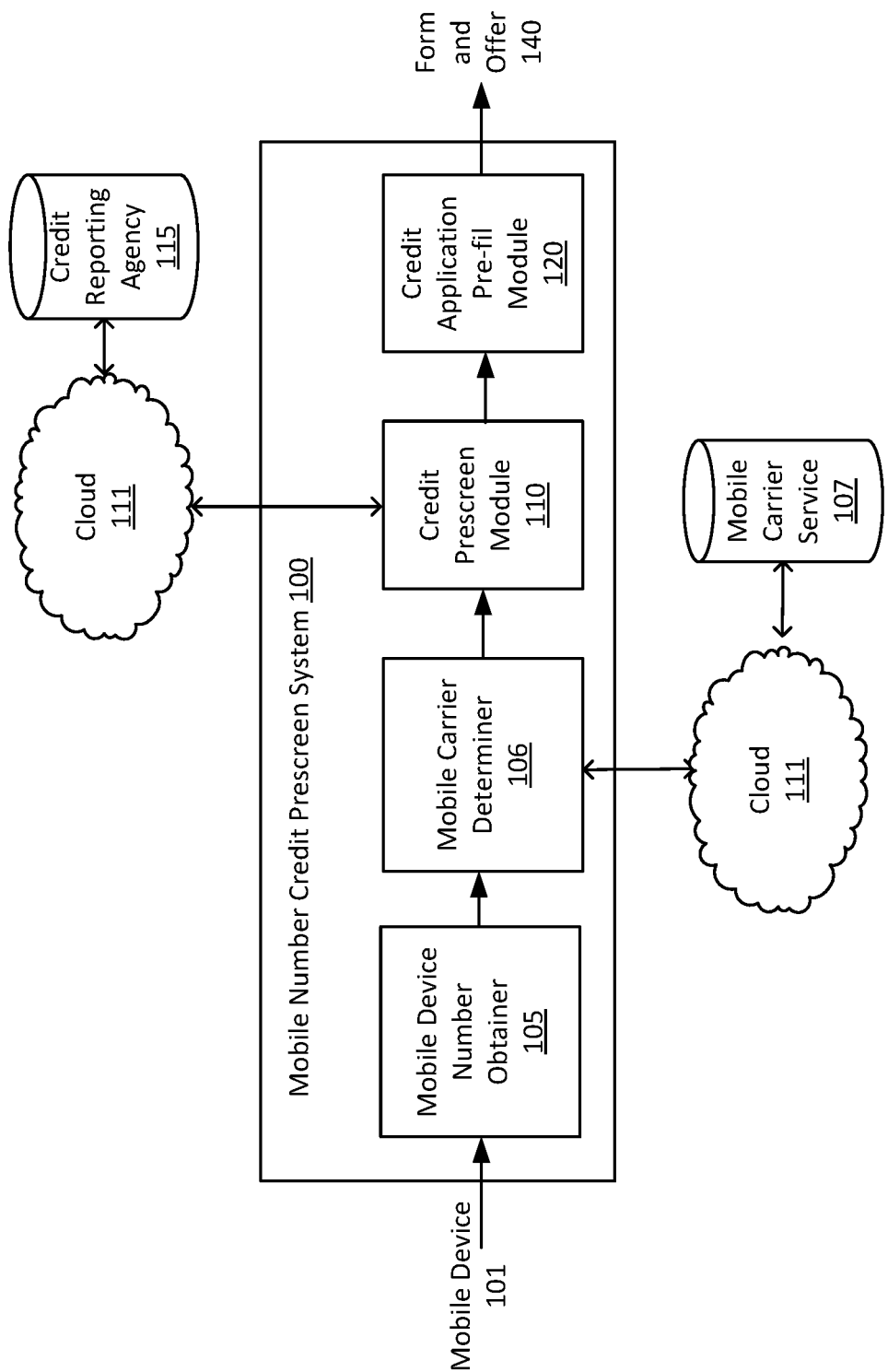
FIG. 1 is a block diagram of a mobile number credit prescreening system, in accordance with an embodiment.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "updating", "accessing", "changing", "correlating", "prescreening", "developing", "presenting" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

Overview

Mobile number credit prescreen is discussed herein. One embodiment obtains a phone number associated with a customer's mobile device. The phone number is utilized to access a mobile carrier service and obtain identifying information about the customer. A credit reporting agency is accessed and the identifying information about the customer is used to perform a credit prescreen. In addition, when the customer passes the credit prescreen, the identifying information about the customer and a result of the credit prescreen are used to pre-fill a credit application form. The pre-filled credit application form in conjunction with a pre-approved credit offer is then provided to the customer for acceptance.

In one embodiment, the pre-filled credit application form and the pre-approved credit offer are provided to the customer via the customer's mobile device. In one embodiment, by providing the offer to the user's mobile device, the interaction and offer are moved away from the register.

In the following discussion, the term "prescreen" is utilized. In general, prescreen refers to a credit prescreen for a customer. That is, a screening of a customer based on some sort of identification information that allows a likely credit determination to be performed via a credit reporting agency. For example, if Tom is pre-screened, identifying information would be obtained, such as, his name and address. The name and address would be used to perform a quick check of at least a portion of Tom's credit history at one of a number of possible credit reporting agencies.

It should be appreciated that the obtaining or accessing of user information conforms to applicable privacy laws (e.g., federal privacy laws, state privacy laws, etc.). In one embodiment, prior to accessing user information, the user affirmatively "opts-in" to the services described herein. For example, during the use of a store's mobile application, the user is prompted with a choice to affirmatively "opt-in" to various services, such as accessing at least the user's mobile device number. As a result, the mobile number information is obtained with the user's prior permission.

Thus, depending on present or future credit prescreening requirements, rules and regulations, the credit prescreen described herein may be more or less formal. For example, if the legislation or regulation requires a customer be informed, or provide authorization, before a review of the customer's credit score is authorized, the credit prescreen described herein would be limited to only overt credit score checks. That is, the customer would authorize the mobile number credit prescreen system to contact the credit reporting agency.

Operation

Referring now to FIG. 1, a block diagram of a mobile number credit prescreen system 100 shown in accordance with an embodiment. In an embodiment, mobile number credit prescreen system 100 obtains a number from a mobile device 101 and determines if the mobile device 101 owner should receive an offer 140. In one embodiment, mobile number credit prescreen system 100 includes mobile device number obtainer 105, mobile carrier determiner 106, credit prescreen module 110, and credit application pre-fill module 120. Although a number of applications and components are shown in mobile number credit prescreen system 100, it should be appreciated that the components and applications may be located separately from one another. For example, one or more of the components and applications may be found on one or more locations, such as, but not limited to a computer in the retail store, a server at a remote location, on the cloud 111, and even on mobile device 101.

In general, mobile device number obtainer 105 is used to obtain a phone number of a customer's mobile device. Mobile device number obtainer 105 may act surreptitiously or overtly in obtaining the mobile device 101 phone number. For example, mobile device number obtainer 105 may obtains the phone number of the customer's mobile device from a text message sent from the customer's mobile device 101 to a retailer's website. In another example, the phone number of the customer's mobile device from a credit prescreen request openly provided to the customer via the mobile device 101. In another embodiment, the phone number may be obtained by having an application on the mobile device broadcast the phone number to an in-store beacon, wirelessly to a store website, or the like.

In one embodiment, mobile carrier determiner 106 is an application that has a hook into a carrier service such that the mobile carrier determiner 106 can provide a phone number to a mobile carrier service 107 to determine customer identification information, such as a customer's name and present home address. For example, mobile device number obtainer 105 will provide the customer's mobile device 101 number to mobile carrier determiner 106. Mobile carrier determiner 106 will access mobile carrier service 107 via cloud 111 to retrieve the customer name and address associated with the mobile device 101 phone number. An example of cloud 111 is a network such as the Internet, local area network (LAN), wide area network (WAN), or the like.

For example, in one embodiment, mobile carrier determiner 106 will use a matching service for porting the phone number to the mobile carrier service 107 to obtain the identifying information about the customer. The matching service could be, but is not limited to, payphone, automatic number identification automatic location identification (ANIALI) and the like, which would access one or more of the mobile device carrier databases and provide the customer information. In one embodiment, there may be a charge to use the matching service such as a per-use charge, a monthly access fee, or the like.

In one embodiment, mobile carrier determiner 106 provides the customer identification information to customer credit prescreen module 110. Customer credit prescreen module 110 accesses a credit reporting agency 115 via cloud 111 to determine credit information for the customer based on the identification information. An example of cloud 111 is a network such as described herein. The credit reporting agency 115 may be a company such as, but not limited to, Experian, Equifax, TransUnion, Innovis and the like.

Customer credit prescreen module 110 will analyze the customer credit information provided by credit reporting agency 115 to determine if the customer passes a prescreen credit criteria. In one embodiment, customer credit prescreen module 110 will also receive a minimum amount. In general, minimum amount refers to a minimum credit limit for the customer to prequalify. For example, the minimum amount may be 5,000.00 USD. In the case where customer credit prescreen module 110 receives a minimum amount, customer credit prescreen module 110 will utilize the customer credit information provided by credit reporting agency 115 in conjunction with the minimum amount requirement to determine if the customer is reasonably likely to receive an acceptable credit line if approved upon application for credit.

Customer credit prescreen module 110 provides the customer credit information provided by the credit reporting agency 115 to credit application pre-fill module 120. Credit application pre-fill module 120 utilizes the customer identification information and the customer credit information provided by the credit reporting agency 115 to determine if the customer qualifies. In one embodiment, if the customer does not pass the credit qualification prescreen, no suggestion to apply for credit will be provided to the customer.

However, if the customer does pass the credit prescreen, credit application pre-fill module 120 will pre-fill a credit application form and provide the pre-filled credit application form in conjunction with a pre-approved credit offer to the customer's mobile device. In one embodiment, credit application pre-fill module 120 will include a security feature in the form and offer 140. For example, the pre-approved credit offer includes a security option such that the offer is not accessible on the customer's mobile device until the customer has correctly answered a security question. The security question may be, but is not limited to, the customer's social security number (or portion thereof), birthday, middle name, child's name, anniversary, high school mascot, or the like.

Figure 2:
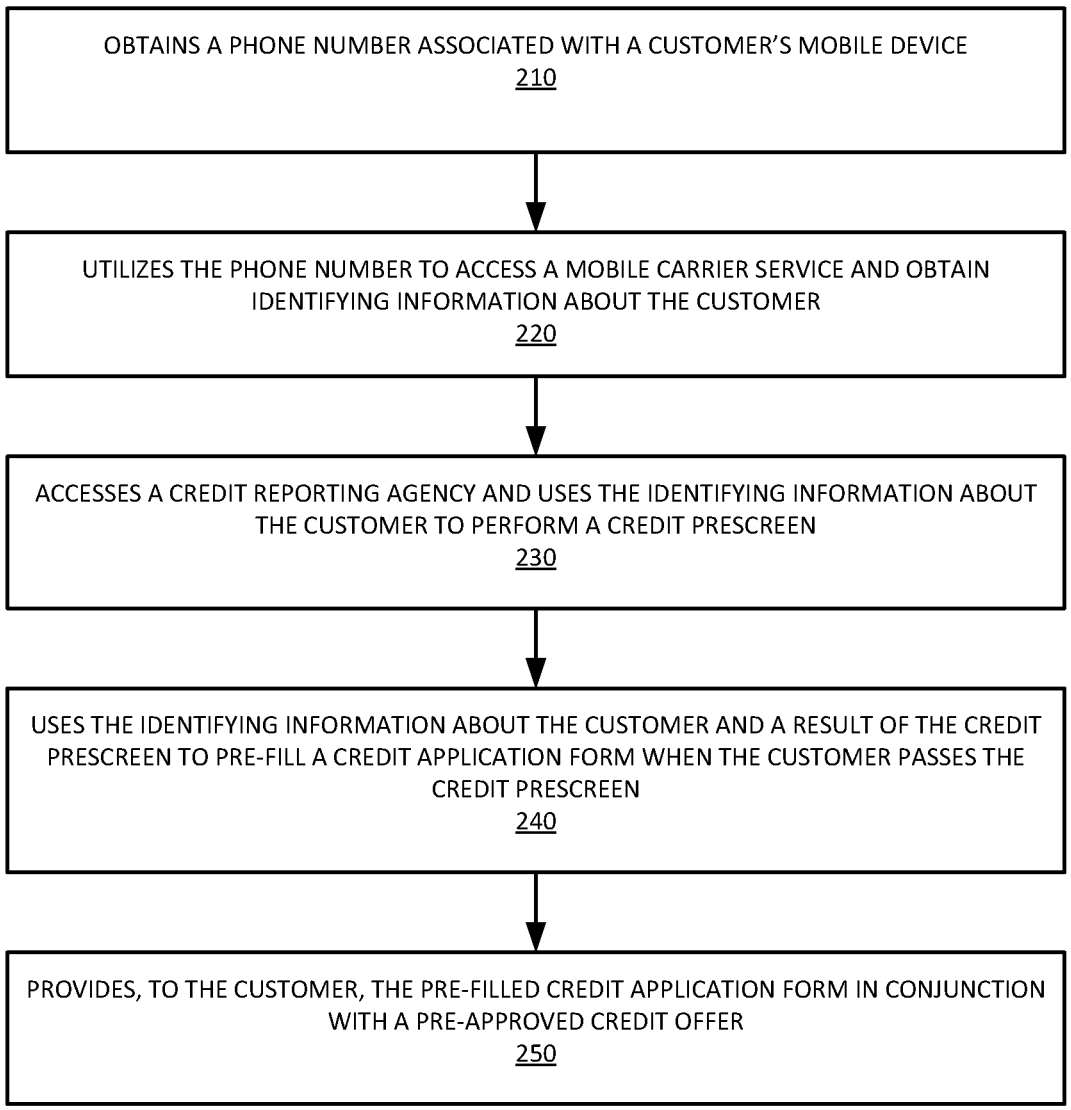
FIG. 2 depicts a flow diagram for a method for mobile number credit prescreen, in accordance with an embodiment.

FIG. 2 depicts a flow diagram 200 for a method for mobile number credit prescreen, in accordance with an embodiment. By prescreening the customer and providing an offer to apply for store credit only to a prequalified customer, the concern of embarrassing the customer due to denial of credit is reduced. Moreover, by providing the offer to the customer on the customer's mobile device 101, the store can move the interaction and offer away from the register area.

With reference now to 210 of FIG. 2 and FIG. 1, one embodiment obtains a mobile phone number associated with a customer's mobile device 101. Examples of a mobile device 101 include, but are not limited to, a mobile phone, tablet, smart glasses, smart watch, and other user portable devices having wireless connectivity. In one embodiment, the phone number may be obtained surreptitiously or may be openly requested by an application that is operable on the customer's mobile device 101. For example, obtaining the customer phone number from a credit prescreen request openly provided to the customer.

In another embodiment, the phone number may be obtained by having an application on the mobile device broadcast the phone number to an in-store beacon. In yet another embodiment, the phone number of the customer may be obtained from a solicitation on a poster, a text message sent to a retailer's website, a scanned code, or the like. In another embodiment, mobile device number obtainer 105 utilizes a customer's specific providing of their mobile phone number for the mobile device 101.

For example, during the shopping process the associate asks the customer's mobile number to sign the customer up to a loyalty program with an instant 10% off of any purchases made that day. The customer provides the associate with the mobile device number. The phone number is then entered into the mobile number credit prescreen system 100, such as by the associate via a mobile device or the like. Mobile number credit prescreen system 100 will then commence prescreening the customer to determine if the customer meets the criteria for store credit.

In general, the information may be provided via wireless connectivity such as 3G, 4G, WiFi, Bluetooth, and the like. In one embodiment, the customer may use the mobile device to scan a barcode on a poster, or the like. For example, the barcode scan will direct the customer's mobile device to an application download option, where a customer can download an application consisting of one or more components of the mobile number credit prescreen system 100 without applying for any type of store credit card.

Referring now to 220 of FIG. 2 and FIG. 1, one embodiment utilizes the phone number to access a mobile carrier service 107 and obtain identifying information about the customer. For example, in one embodiment mobile carrier determination application 106 has a hook into the carrier service used by the customer's mobile device. The mobile carrier determiner 106 will utilize the phone number when accessing the mobile carrier service to determine customer identification information stored at the mobile carrier service 107. For example, by using a matching service to port the phone number to the mobile carrier to obtain the identifying information about the customer.

In one embodiment, customer identification information includes a customer's name and current address. However, in another embodiment, customer identification information includes enough information to enable a credit prescreening. For example, customer identification information may be one or more of a name and address, driver's license number, social security number, or other unique customer identifier.

Referring now to 230 of FIG. 2 and FIG. 1, one embodiment accesses a credit reporting agency and using the identifying information about the customer to perform a credit prescreen. For example, the identification information obtained by mobile carrier determination application is passed to credit prescreen module 110 where the identification information is used by credit prescreen module 110 to access credit reporting agency 115 via cloud 111 and determine if the customer qualifies for store credit.

With reference now to 240 of FIG. 2 and FIG. 1, in one embodiment when the customer passes the credit prescreen, credit application pre-fill module 120 utilizes the identifying information about the customer and a result of the credit prescreen to pre-fill a credit application form.

Referring now to 250 of FIG. 2 and FIG. 1, one embodiment provides, to the customer, the pre-filled credit application form in conjunction with a pre-approved credit offer. In one embodiment, the form and offer 140 may be presented to the customer via the customer's mobile device 101. For example, the form and offer 140 may be provided via a text message, email or the like to the customer's mobile device 101. In one embodiment, to ensure confidentiality the customer is asked a security question and the form and offer will not be accessible to the customer until the security question is properly answered.

In another embodiment, no pre-approved credit offer is provided to the customer when the customer fails to pass the credit prescreen. In other words, unsuccessful results would not be sent to the customer's mobile device 101. Thereby the possibility for an uncomfortable exchange with a customer wherein the customer is asked to apply for a store credit card and then informed that they did not qualify.

Example Computer System Environment

Figure 3:
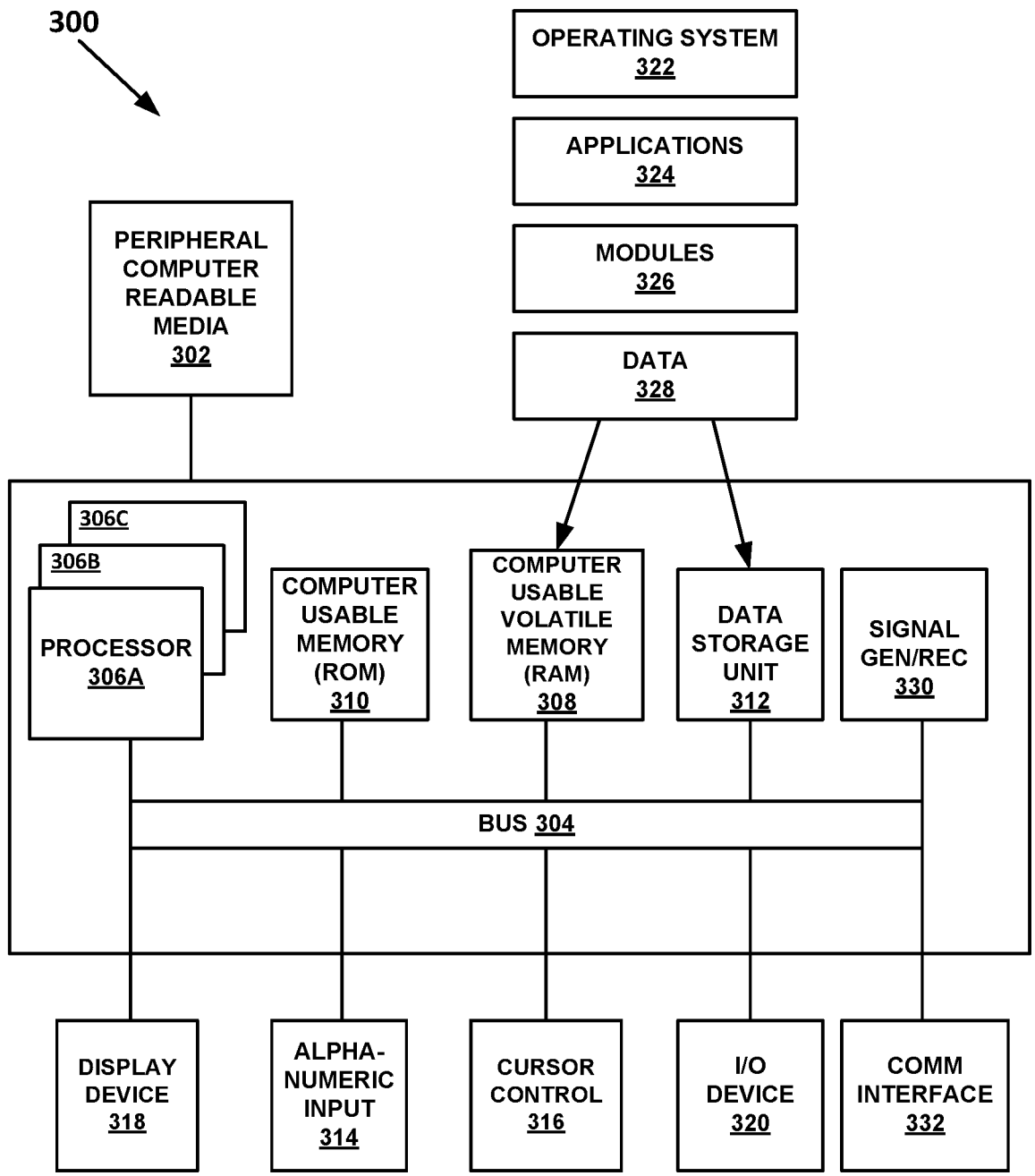
FIG. 3 is a block diagram of an example computer system with which or upon which various embodiments of the present invention may be implemented.

With reference now to FIG. 3, portions of the technology for providing a communication composed of computer-readable and computer-executable instructions that reside, for example, in non-transitory computer-usable storage media of a computer system. That is, FIG. 3 illustrates one example of a type of computer that can be used to implement embodiments of the present technology. FIG. 3 represents a system or components that may be used in conjunction with aspects of the present technology. In one embodiment, some or all of the components described herein may be combined with some or all of the components of FIG. 3 to practice the present technology.

FIG. 3 illustrates an example computer system 300 used in accordance with embodiments of the present technology. It is appreciated that system 300 of FIG. 3 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 3, computer system 300 of FIG. 3 is well adapted to having peripheral computer readable media 302 such as, for example, a floppy disk, a compact disc, a flash drive, and the like coupled thereto.

Computer system 300 of FIG. 3 includes an address/data/control bus 304 for communicating information, and a processor 306A coupled to bus 304 for processing information and instructions. As depicted in FIG. 3, system 300 is also well suited to a multi-processor environment in which a plurality of processors 306A, 306B, and 306C are present. Conversely, system 300 is also well suited to having a single processor such as, for example, processor 306A. Processors 306A, 306B, and 306C may be any of various types of microprocessors. Computer system 300 also includes data storage features such as a computer usable volatile memory 308, e.g., random access memory (RAM), coupled to bus 304 for storing information and instructions for processors 306A, 306B, and 306C.

System 300 also includes computer usable non-volatile memory 310, e.g., read only memory (ROM), coupled to bus 304 for storing static information and instructions for processors 306A, 306B, and 306C. Also present in system 300 is a data storage unit 312 (e.g., a magnetic disk drive, optical disk drive, solid state drive (SSD), and the like) coupled to bus 304 for storing information and instructions. Computer system 300 also includes an optional alpha-numeric input device 314 including alphanumeric and function keys coupled to bus 304 for communicating information and command selections to processor 306A or processors 306A, 306B, and 306C. Computer system 300 also includes an optional cursor control device 316 coupled to bus 304 for communicating user input information and command selections to processor 306A or processors 306A, 306B, and 306C. Optional cursor control device may be a touch sensor, gesture recognition device, and the like. Computer system 300 of the present embodiment also includes an optional display device 318 coupled to bus 304 for displaying information.

Referring still to FIG. 3, optional display device 318 of FIG. 3 may be a liquid crystal device, cathode ray tube, OLED, plasma display device or other display device suitable for creating graphic images and alpha-numeric characters recognizable to a user. Optional cursor control device 316 allows the computer user to dynamically signal the movement of a visible symbol (cursor) on a display screen of display device 318. Many implementations of cursor control device 316 are known in the art including a trackball, mouse, touch pad, joystick, non-contact input, gesture recognition, voice commands, bio recognition, and the like. In addition, special keys on alpha-numeric input device 314 capable of signaling movement of a given direction or manner of displacement. Alternatively, it will be appreciated that a cursor can be directed and/or activated via input from alpha-numeric input device 314 using special keys and key sequence commands.

System 300 is also well suited to having a cursor directed by other means such as, for example, voice commands. Computer system 300 also includes an I/O device 320 for coupling system 300 with external entities. For example, in one embodiment, I/O device 320 is a modem for enabling wired or wireless communications between system 300 and an external network such as, but not limited to, the Internet or intranet. A more detailed discussion of the present technology is found below.

Referring still to FIG. 3, various other components are depicted for system 300. Specifically, when present, an operating system 322, applications 324, modules 326, and data 328 are shown as typically residing in one or some combination of computer usable volatile memory 308, e.g. random access memory (RAM), and data storage unit 312. However, it is appreciated that in some embodiments, operating system 322 may be stored in other locations such as on a network or on a flash drive; and that further, operating system 322 may be accessed from a remote location via, for example, a coupling to the internet. In one embodiment, the present technology, for example, is stored as an application 324 or module 326 in memory locations within RAM 308 and memory areas within data storage unit 312. The present technology may be applied to one or more elements of described system 300.

System 300 also includes one or more signal generating and receiving device(s) 330 coupled with bus 304 for enabling system 300 to interface with other electronic devices and computer systems. Signal generating and receiving device(s) 330 of the present embodiment may include wired serial adaptors, modems, and network adaptors, wireless modems, and wireless network adaptors, and other such communication technology. The signal generating and receiving device(s) 330 may work in conjunction with one or more communication interface(s) 332 for coupling information to and/or from system 300. Communication interface 332 may include a serial port, parallel port, Universal Serial Bus (USB), Ethernet port, Bluetooth, thunderbolt, near field communications port, WiFi, Cellular modem, or other input/output interface. Communication interface 332 may physically, electrically, optically, or wirelessly (e.g., via radio frequency) couple system 300 with another device, such as a mobile phone, radio, or computer system.

The computing system 300 is only one example of a suitable computing environment and is not intended to suggest any limitation as to the scope of use or functionality of the present technology. Neither should the computing environment be interpreted as having any dependency or requirement relating to any one or combination of components illustrated in the example computing system 300.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A non-transitory computer-readable storage medium having instructions embodied therein that when executed cause a computer system to perform a method for mobile number credit prescreen, the method comprising:
   receiving a wireless broadcast at an in-store beacon, the wireless broadcast comprising a phone number associated with a customer's mobile device;
   providing, to the computer system and from the in-store beacon, the phone number;
   accessing, via the computer system, a mobile carrier service;
   utilizing, via the computer system, the phone number to obtain identifying information about the customer from the mobile carrier service;
   accessing, via the computer system, a credit reporting agency;
   using, via the computer system and from the credit reporting agency, the identifying information about the customer to obtain a credit report;
   using, at the computer system, the credit report to perform a credit prescreen;
   utilizing, at the computer system, the identifying information about the customer and a result of the credit prescreen to pre-fill a credit application form; and
   providing, from the computer system and to the customer's mobile device, the pre-filled credit application form in conjunction with a pre-approved credit offer.

2. The method of claim 1, further comprising:
   asking the customer a security question; and
   not providing the pre-approved credit offer to the customer unless the security question is properly answered.

3. The method of claim 1, further comprising:
   obtaining the customer phone number surreptitiously.

4. The method of claim 1 further comprising:
   using a matching service for porting the phone number to the mobile carrier to obtain the identifying information about the customer.

5. The method of claim 1, further comprising:
   obtaining a name and a current address as the identifying information.

6. The method of claim 1, further comprising:
   providing no pre-approved credit offer to the customer when the customer fails to pass the credit prescreen.

7. A mobile number credit prescreen system comprising:
an in-store beacon to receive a wireless broadcast from a customer's mobile device, the wireless broadcast comprising a phone number of the customer's mobile device, the wireless broadcast initiated by an application operating on the customer's mobile device;
a mobile carrier determiner to access a mobile carrier service and use the phone number of the customer's mobile device to obtain identifying information about the customer;
a credit prescreen module to access a credit reporting agency and use the identifying information about the customer to perform a credit prescreen; and
a credit application pre-fill module to utilizing the identifying information about the customer and a result of the credit prescreen to pre-fill a credit application form and provide, to the customer, the pre-filled credit application form in conjunction with a pre-approved credit offer.

8. The system of claim 7 wherein the pre-approved credit offer is not accessible on the customer's mobile device until the customer has correctly answered a security question.

9. The system of claim 7 wherein the in-store beacon receives the phone number of the customer's mobile device surreptitiously.

10. The system of claim 7 wherein the mobile carrier determiner uses a matching service for porting the phone number to the mobile carrier to obtain the identifying information about the customer.

11. The system of claim 7 wherein the mobile carrier determiner obtains a name and a current address as the identifying information.

12. The system of claim 7 wherein the credit application pre-fill module provides the pre-filled credit application form in conjunction with a pre-approved credit offer to the customer's mobile device.

13. The system of claim 7 wherein the credit application pre-fill module provides no pre-approved credit offer to the customer when the customer fails to pass the credit prescreen.

14. A non-transitory computer-implemented method for mobile number credit prescreen, the method comprising:
receiving, at an in-store beacon, a wireless broadcast from a customer's mobile device, the wireless broadcast initiated by an application operating on the customer's mobile device, the wireless broadcast comprising a phone number associated with the customer's mobile device;
providing, to a computer system and from the in-store beacon, the phone number;
accessing, via the computer system, a mobile carrier service;
utilizing, via the computer system, the phone number to obtain identifying information about the customer from the mobile carrier service;
accessing, via the computer system, a credit reporting agency;
using, via the computer system and from the credit reporting agency, the identifying information about the customer to obtain a credit report;
using, at the computer system, the credit report to perform a credit prescreen;
utilizing, at the computer system, the identifying information about the customer and a result of the credit prescreen to pre-fill a credit application form; and
providing, from the computer system and to the customer's mobile device, the pre-filled credit application form in conjunction with a pre-approved credit offer.

15. The non-transitory computer-implemented method of claim 14, further comprising:
obtaining a name and a current address as the identifying information.

* * * * *